United States Patent
Gall et al.

(10) Patent No.: US 9,664,253 B2
(45) Date of Patent: May 30, 2017

(54) CROWNED PROFILE DRIVESHAFT JOURNAL

(71) Applicant: GKN Driveline North America, Inc., Auburn Hills, MI (US)

(72) Inventors: David E. Gall, Clarkston, MI (US); Edward K. Kwon, Troy, MI (US); Kevin P. Horak, Clarkston, MI (US)

(73) Assignee: GKN DRIVELINE NORTH AMERICA, INC., Auburn Hills, MI (US)

( * ) Notice: Subject to any disclaimer, the term of this patent is extended or adjusted under 35 U.S.C. 154(b) by 38 days.

(21) Appl. No.: 14/851,813

(22) Filed: Sep. 11, 2015

(65) Prior Publication Data

US 2017/0074381 A1    Mar. 16, 2017

(51) Int. Cl.
*F16H 48/40* (2012.01)
*F16H 1/00* (2006.01)
*F16H 48/08* (2006.01)

(52) U.S. Cl.
CPC .............. *F16H 1/00* (2013.01); *F16H 48/08* (2013.01); *F16H 48/40* (2013.01)

(58) Field of Classification Search
CPC .................................. F16H 48/40; F16H 48/08
USPC ........................................ 475/230; 74/606 R
See application file for complete search history.

(56) References Cited

U.S. PATENT DOCUMENTS

| 913,424 | A | | 2/1909 | Nehring |
|---|---|---|---|---|
| 3,829,147 | A | | 8/1974 | Ryswick |
| 4,004,471 | A | | 1/1977 | Keske |
| 4,132,090 | A | | 1/1979 | McDermott |
| 6,105,495 | A | | 8/2000 | Takahashi et al. |
| 7,036,391 | B2 | | 5/2006 | Tsuchiya et al. |
| 7,597,642 | B2 | | 10/2009 | Kim |
| 8,152,680 | B2 | | 4/2012 | Krude et al. |
| 2004/0127323 | A1 | * | 7/2004 | Wachter .................. F16H 48/08 475/243 |
| 2004/0152554 | A1 | * | 8/2004 | Krude .................. B60K 17/165 475/220 |
| 2005/0252328 | A1 | | 11/2005 | Shattuck et al. |
| 2011/0021305 | A1 | | 1/2011 | Radzevich |
| 2014/0223901 | A1 | * | 8/2014 | Versteyhe ............. F02B 37/105 60/605.1 |

(Continued)

FOREIGN PATENT DOCUMENTS

| CN | 101451602 B | 6/2009 |
|---|---|---|
| JP | S58217858 | 12/1983 |

*Primary Examiner* — Roger Pang
(74) *Attorney, Agent, or Firm* — Jennifer M. Brumbaugh; Reising Ethington P.C.

(57) ABSTRACT

In at least some implementations, a differential for a vehicle includes a pinion gear, a pair of side gears and a housing. The side gears are meshed with the pinion gear and the housing defines a cavity in which the pinion gear and side gears are received. The housing also has an opening with an inner end leading to the cavity and an outer end spaced from the inner end. The opening is adapted to receive a shaft therethrough for coupling of the shaft to one of the side gears and the opening is defined at least in part by a journal surface. The journal surface is concave with respect to the shaft and provides a converging portion from the inner end to a central portion between the inner end and outer end and a diverging portion from the central portion to the outer end.

15 Claims, 3 Drawing Sheets

(56) References Cited

U.S. PATENT DOCUMENTS

2015/0152952 A1\* 6/2015 Miyazono ............... F16H 48/08
475/230

\* cited by examiner

US 9,664,253 B2

CROWNED PROFILE DRIVESHAFT JOURNAL

TECHNICAL FIELD

The present disclosure relates generally to a vehicle differential.

BACKGROUND

Automobile drivelines are commonly equipped with one or more differentials between sideshafts of a front axle, a rear axle, or both axles. In general, differentials allow wheels driven by one sideshaft to spin faster or slower than wheels driven by the other sideshaft when an automobile is taking a turn. Differentials can also apportion driven torque flow between the sideshafts.

SUMMARY

In at least some implementations, a differential for a vehicle includes a pinion gear, a pair of side gears and a housing. The side gears are meshed with the pinion gear and the housing defines a cavity in which the pinion gear and side gears are received. The housing also has an opening with an inner end leading to the cavity and an outer end spaced from the inner end. The opening is adapted to receive a shaft therethrough for coupling of the shaft to one of the side gears and the opening is defined at least in part by a journal surface. The journal surface is concave with respect to the shaft and provides a converging portion from the inner end to a central portion between the inner end and outer end and a diverging portion from the central portion to the outer end.

In at least some implementations, the central portion has a constant diameter. The converging and diverging portions may be defined by inclined portions that are each arranged at an angle to the central portion that is the same magnitude, and which may have the same axial length, and which may be linearly tapered so that the diameter of each inclined portion increases from an end of the inclined portion that joins the central portion to an opposite end of each inclined portion.

In at least some implementations, a differential for a vehicle includes a pinion gear that rotates about a first axis, a pair of side gears meshed with the pinion gear to rotate about a second axis that is transverse to the first axis, and a housing. The housing defines a cavity in which the pinion gear and side gears are received and is adapted to rotate about the second axis. The housing also has an opening with an inner end leading to the cavity and an outer end spaced from the inner end. The opening is adapted to receive a shaft therethrough for coupling of the shaft to one of the side gears, and the opening is defined at least in part by a journal surface. The journal surface is concave with respect to the shaft and has a central portion spaced from both the inner end and the outer end which is coaxially aligned with the second axis, a converging portion from the inner end to the central portion and a diverging portion from the central portion to the outer end.

BRIEF DESCRIPTION OF THE DRAWINGS

The following detailed description of preferred embodiments and best mode will be set forth with reference to the accompanying drawings, in which.

DETAILED DESCRIPTION

Figure 1:
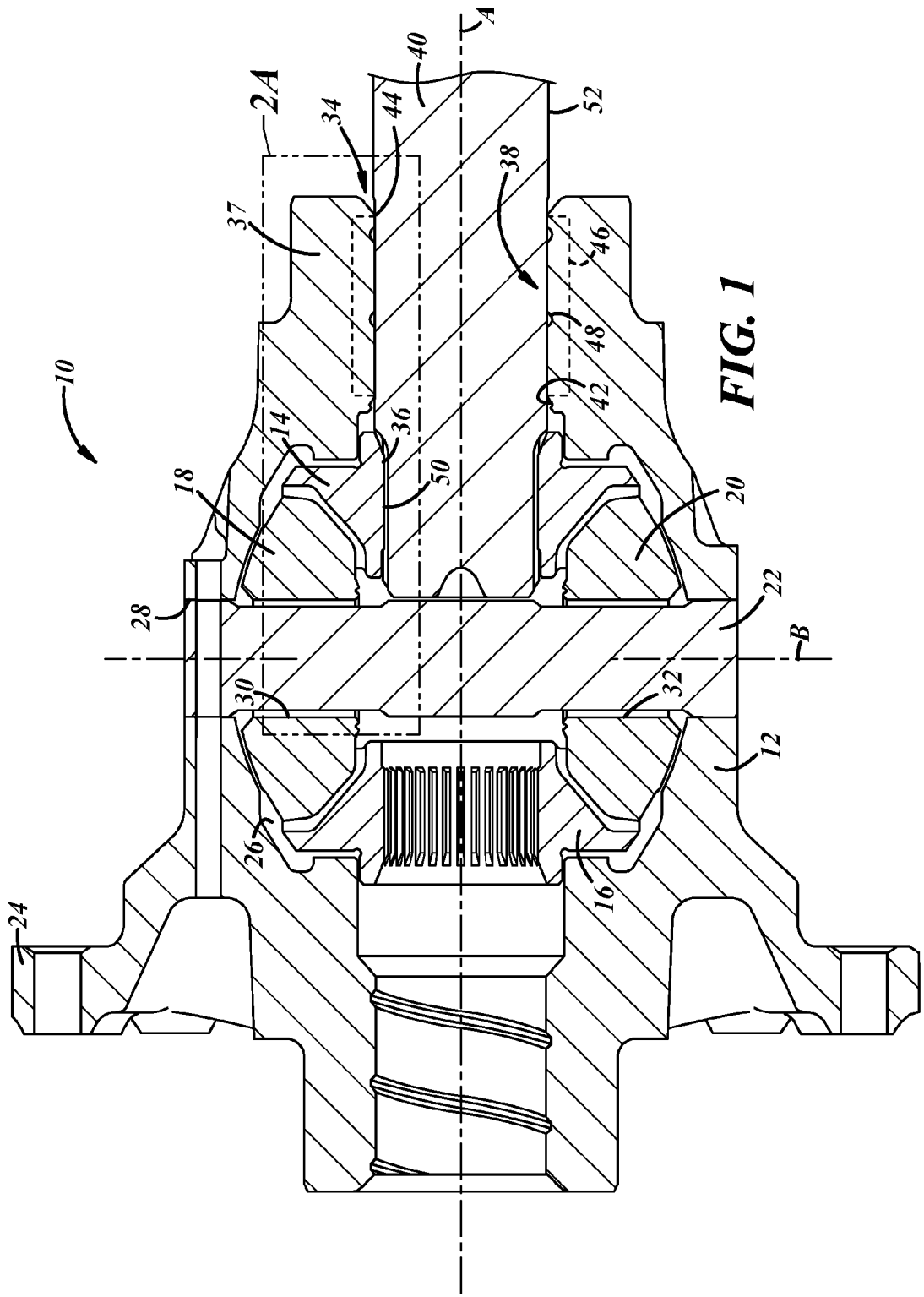
FIG. 1 is a cross-sectional view of a differential.
Figure 2A:
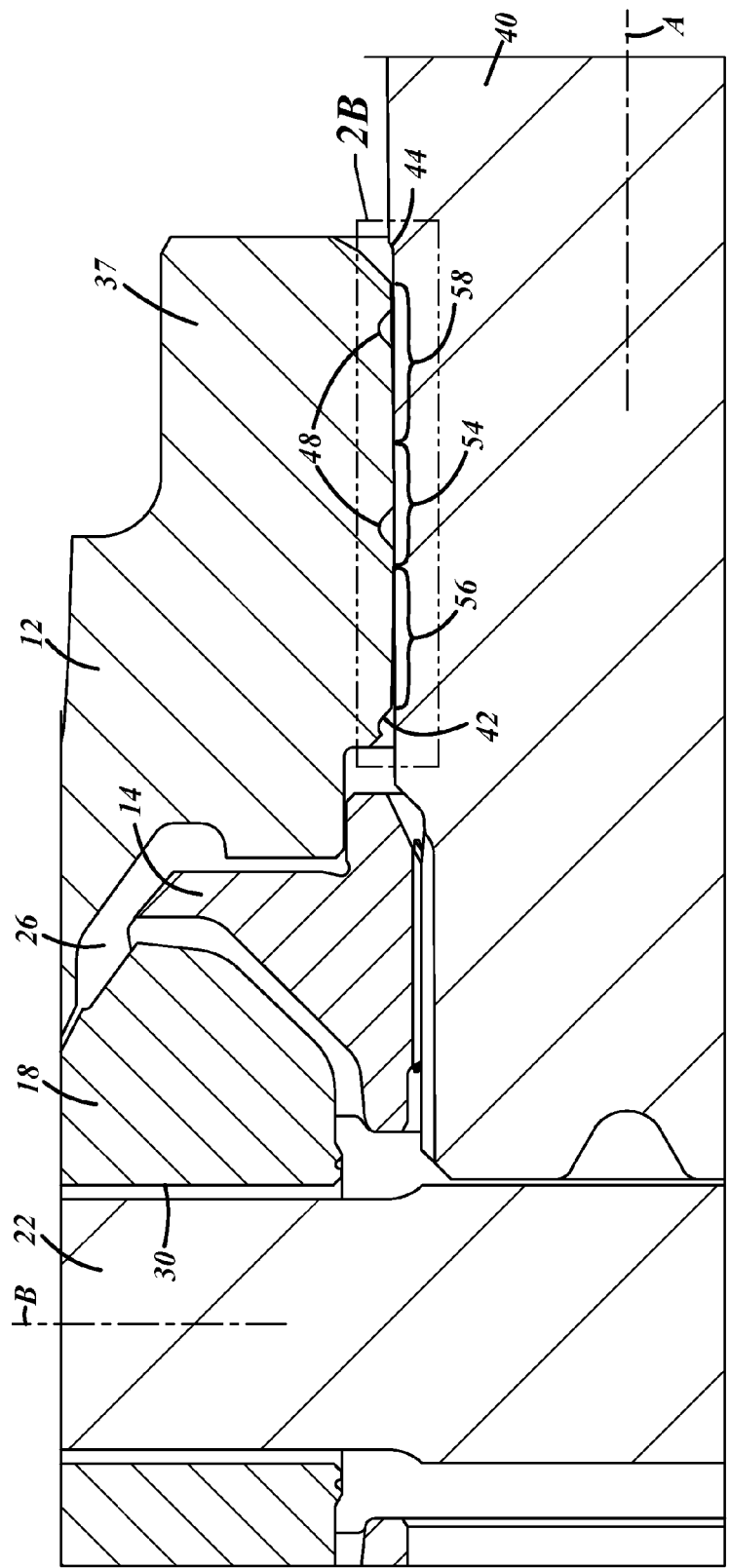
FIG. 2A is an enlarged, fragmentary sectional view of a portion of the differential of FIG. 1.
Figure 2B:
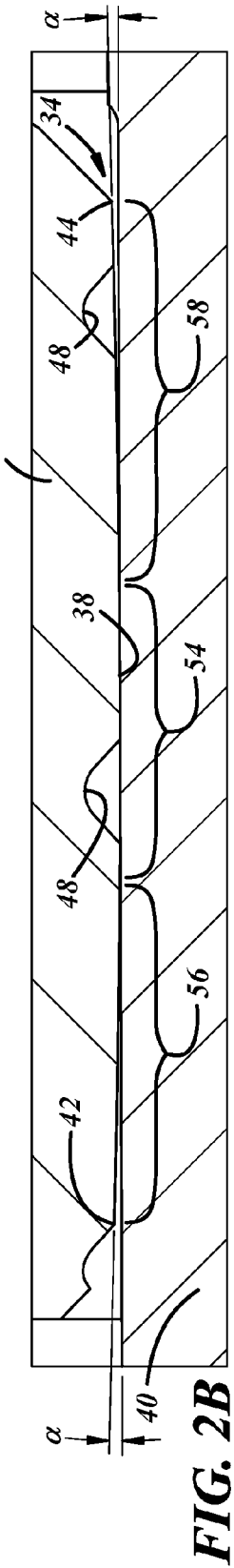
FIG. 2B is an enlarged, fragmentary sectional view of the portion 2B shown in FIG. 2A.

Referring in more detail to the drawings, FIGS. 1, 2A and 2B illustrate a differential 10 for a vehicle, such as an automobile. The differential 10 includes a housing 12, a first side gear 14, a second side gear 16, a first pinion gear 18, a second pinion gear 20, and a pinion shaft 22. The first and second side gears 14, 16 and first and second pinion gears 18, 20 mesh with one another during use of the differential 10. The first and second side gears 14, 16, in particular, rotate about a first axis A, and the first and second pinion gears 18, 20 rotate about a second axis B that is transverse to the first axis A. The pinion gears 18, 20 are also coupled to the housing (e.g. pinion shaft 22 may be pinned or otherwise connected to the housing) for rotation with the housing about axis A. The differential 10 may be configured as an open, limited slip, or locking differential.

The housing 12 may include a flange 24 that may be integrally provided in the housing and, in assembly, may be coupled to a ring gear (not shown) through which torque may be introduced to the differential housing 12 to rotate the differential housing 12. To receive the gears 14, 16, 18, 20, the housing 12 defines an internal cavity 26. To receive the pinion shaft 22, the housing 12 may include an opening 28 oriented along axis B and aligned with openings 30, 32 through the pinion gears 18, 20. A side opening 34 may be oriented along axis A and may extend to the cavity 26 and be generally coaxially aligned with an opening 36 in the first side gear 14.

The side opening 34 may be defined in an outward projection 37 of the housing and by a journal surface 38 which may be coaxially arranged with the opening 36 in the first side gear 14 to receive a shaft 40 through the side opening 34 and at least partially within the side gear opening 36. The side opening 34 may extend from an inner end 42 facing the side gear 14 to an outer end 44 through which the shaft 40 is initially received. The journal surface 38 may rotatably support and journal the shaft 40 for rotation relative to the housing 12. The journal surface 38 may be defined by a bushing or bearing 46 (diagrammatically shown in dashed lines in FIG. 1 as an alternative) that is formed separately from the housing 12 and carried by the housing within the opening 34, or the journal surface 38 may be defined within the material of the housing itself without any separately carried bearing or other component. The journal surface 38 may have any desired surface finish, and may include one or more grooves 48 that transfer lubricant between the exterior and interior of the housing when the shaft rotates relative to the housing.

The shaft 40 is rotationally coupled to the side gear 14 by a connection feature, such as splines 50, teeth or a key formed at or near an end of the shaft 40, so that the shaft 40 and side gear 14 rotate together. The shaft 40 may be generally cylindrical and include an outer surface 52 a portion of which is received within the side opening 34 and may have a constant outer diameter of a size designed for a close fit with at least a portion of the journal surface 38.

As shown in FIGS. 2A and 2B, the journal surface 38 may include a central portion 54 that has a constant diameter slightly larger than the outer diameter of the corresponding portion of the shaft 40 and aligned with the axis B. The journal surface 38 may also include two inclined portions 56, 58, each becoming radially larger as they extend axially away from the central portion 54. A first inclined portion 56 extends from the central portion 54 toward the inner end 42 of the opening 34 and a second inclined portion 58 extends from the central portion 54 toward the outer end 44 of the opening 34. The inclined portions 56, 58 are thus separated from each other by the central portion 54. The inclined portions 56, 58 may be linearly tapered and have a diameter that increases along their axial length from a minimum diameter at the junction with the central portion 54 to a maximum diameter at the other end of each inclined portion. The inclined portions 56, 58 need not be linear and can be arcuate or curved as desired. With the inclined portions 56, 58, the journal surface 38 has an overall convex shape facing the shaft 40. Leading from the cavity 26 to the exterior of the housing 12, the inclined portion 56 defines a converging portion from the inner end 42 of the opening 34 to the central portion 54 and the other inclined surface 58 defines a diverging portion from the central portion 54 to the outer end 44 of the opening 34. The inclined portions 56, 58 may have the same taper angle α. Hence, the journal surface 38 has an increasing diameter from the central portion 54 outwardly in opposed directions toward both the inner and outer ends 42, 44 of the opening 34 which provides increasing clearance between the journal surface 38 and the shaft 40.

Figure 3A:
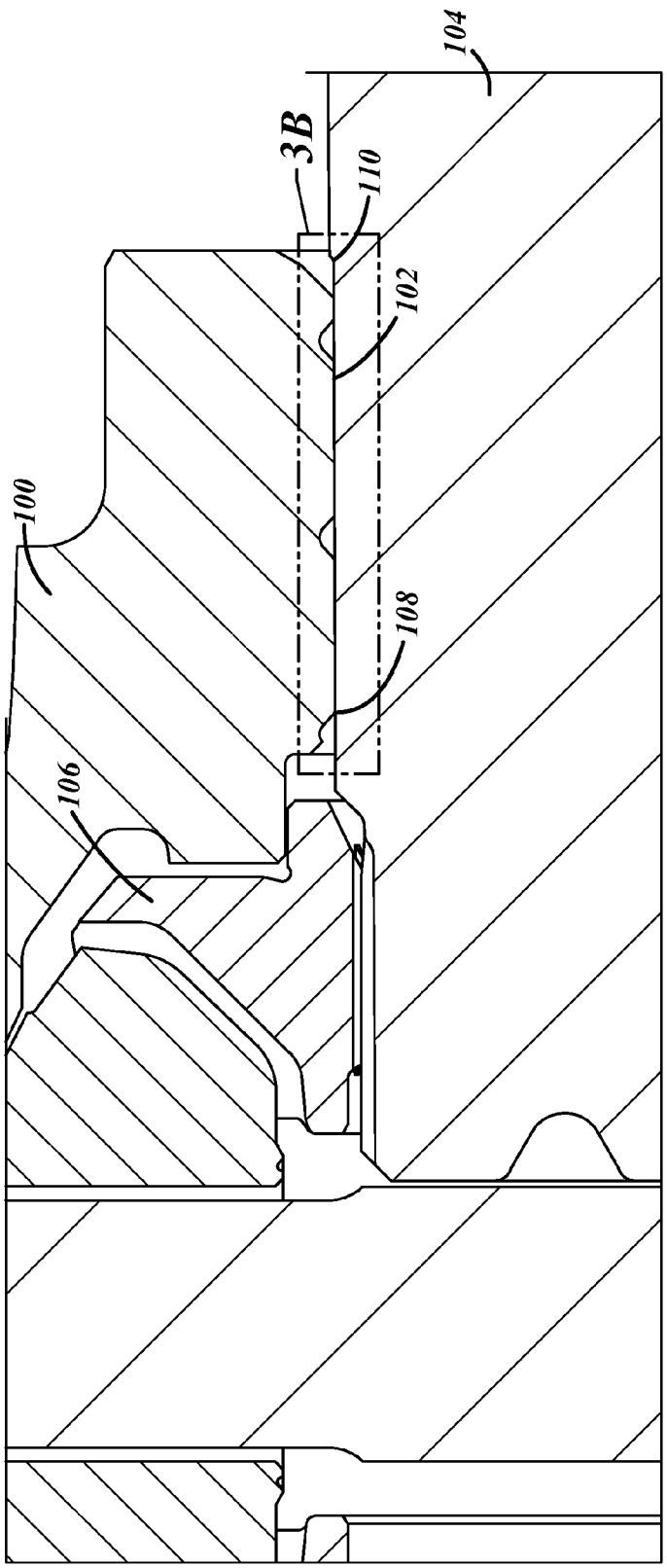
FIG. 3A is an enlarged, fragmentary sectional view of a portion of a differential according to the prior art.
Figure 3B:
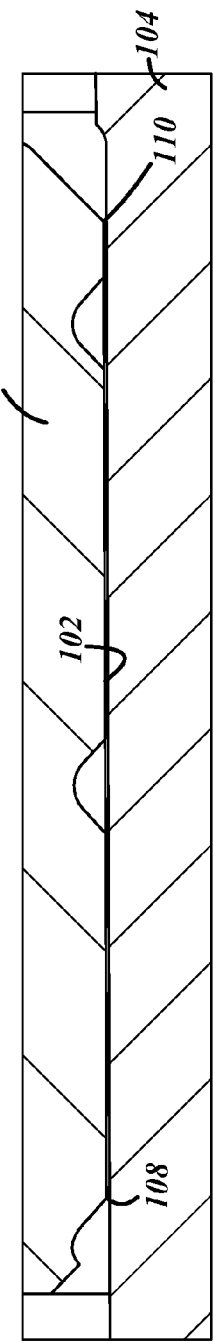
FIG. 3B is an enlarged, fragmentary sectional view of the portion 3B shown in FIG. 3A.

In the prior art differential housing 100, shown in FIGS. 3A and 3B, the journal surface 102 has a constant diameter along its entire axial length. In this arrangement, the same, minimal clearance is provided between the shaft 104 and the journal surface 102 along the entire axial length of the journal surface. In use, the shaft 104 may become misaligned relative to the journal surface 102 due to forces on one or more of the shaft 104, side gear 106 and housing 100 in use, or due to tolerances in the manufacturing of these components. With the constant diameter journal surface 102, misalignment of the shaft 104 can cause contact between the shaft 104 and an edge (e.g. 108 or 110) of the housing 100 which may score or otherwise wear the shaft 104, housing 100 or both.

With the housing 12 and journal surface 38 shown in FIGS. 1, 2A and 2B, the shaft 40 is primarily supported by the central portion 54 and misalignment of the shaft 40 is accommodated by the greater diameter inclined portions 56, 58 to reduce or avoid the edge contact and resulting wear on the shaft 40 or housing 12. In at least some implementations, the inclined portions 56, 58 have the same axial length with the central portion 54 centered between the two, although other arrangements are possible.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A differential for a vehicle, comprising:
   at least one pinion gear;
   a pair of side gears meshed with the at least one pinion gear; and
   a housing defining a cavity in which the at least one pinion gear and side gears are received, the housing having an opening with an inner end leading to the cavity and an outer end located at a point of the opening axially furthest from the cavity, and the opening being adapted to receive a shaft therethrough for coupling of the shaft to one of the side gears, the opening being defined at least in part by a journal surface that is convex in shape facing the shaft and provides a converging portion from the inner end to a central portion between the inner end and outer end and a diverging portion from the central portion to the outer end, and wherein the journal surface contacts the shaft at the central portion.

2. The differential of claim 1 wherein the central portion has a constant diameter.

3. The differential of claim 1 wherein the converging portion is defined by an inclined portion and the diverging portion is defined by another inclined portion.

4. The differential of claim 3 wherein the inclined portions are each arranged at an angle to the central portion that is the same magnitude.

5. The differential of claim 3 wherein the inclined portions are linearly tapered so that the diameter of each inclined portion increases from an end of the inclined portion that joins the central portion to an opposite end of each inclined portion.

6. The differential of claim 4 wherein the inclined portions are arranged at an angle of greater than zero degrees relative to the central portion.

7. The differential of claim 3 wherein the axial length of the inclined portions is the same.

8. The differential of claim 1 wherein the side gears rotate about an axis and the central portion of the side opening is coaxially aligned with the axis of rotation of the side gears.

9. The differential of claim 1 which also comprises a groove formed in the housing, the groove is formed in the journal surface but does not define the converging portion or the diverging portion of the journal surface.

10. A differential for a vehicle, comprising:
    at least one pinion gear that rotates about a first axis;
    a pair of side gears meshed with the at least one pinion gear to rotate about a second axis that is transverse to the first axis; and
    a housing defining a cavity in which the at least one pinion gear and side gears are received, the housing adapted to rotate about the second axis, having an opening with an inner end leading to the cavity and an outer end spaced from the inner end and the cavity, the opening being adapted to receive a shaft therethrough for coupling of the shaft to one of the side gears, and the opening being defined at least in part by a journal surface that is convex in shape facing the opening irrespective of any groove or void that is formed in the housing and which interrupts the journal surface, and the journal surface has a central portion spaced from both the inner end and the outer end and coaxially aligned with the second axis, a converging portion from the inner end to the central portion and a diverging portion from the central portion to the outer end, and wherein the journal surface is arranged to contact the shaft at the central portion.

11. The differential of claim 10 wherein the converging portion and diverging portion are both arranged at an angle to the central portion that is the same magnitude.

12. The differential of claim 10 wherein the converging portion and diverging portion are linearly tapered so that the diameter of each of the converging portion and the diverging portion increases from an end of each that joins the central portion to an opposite end of each of the converging portion and diverging portion.

13. The differential of claim 10 wherein the axial length of the converging portion and the diverging portion is the same.

14. The differential of claim 10 which also comprises a groove formed in the housing, the groove is formed in the journal surface but does not define the converging portion or the diverging portion of the journal surface.

15. The differential of claim 10 wherein the outer end is at a point axially furthest from the cavity.

* * * * *